Oct. 28, 1930.  H. BLUM  1,779,799
DIRECTION INDICATOR
Filed Aug. 15, 1928   3 Sheets-Sheet 1
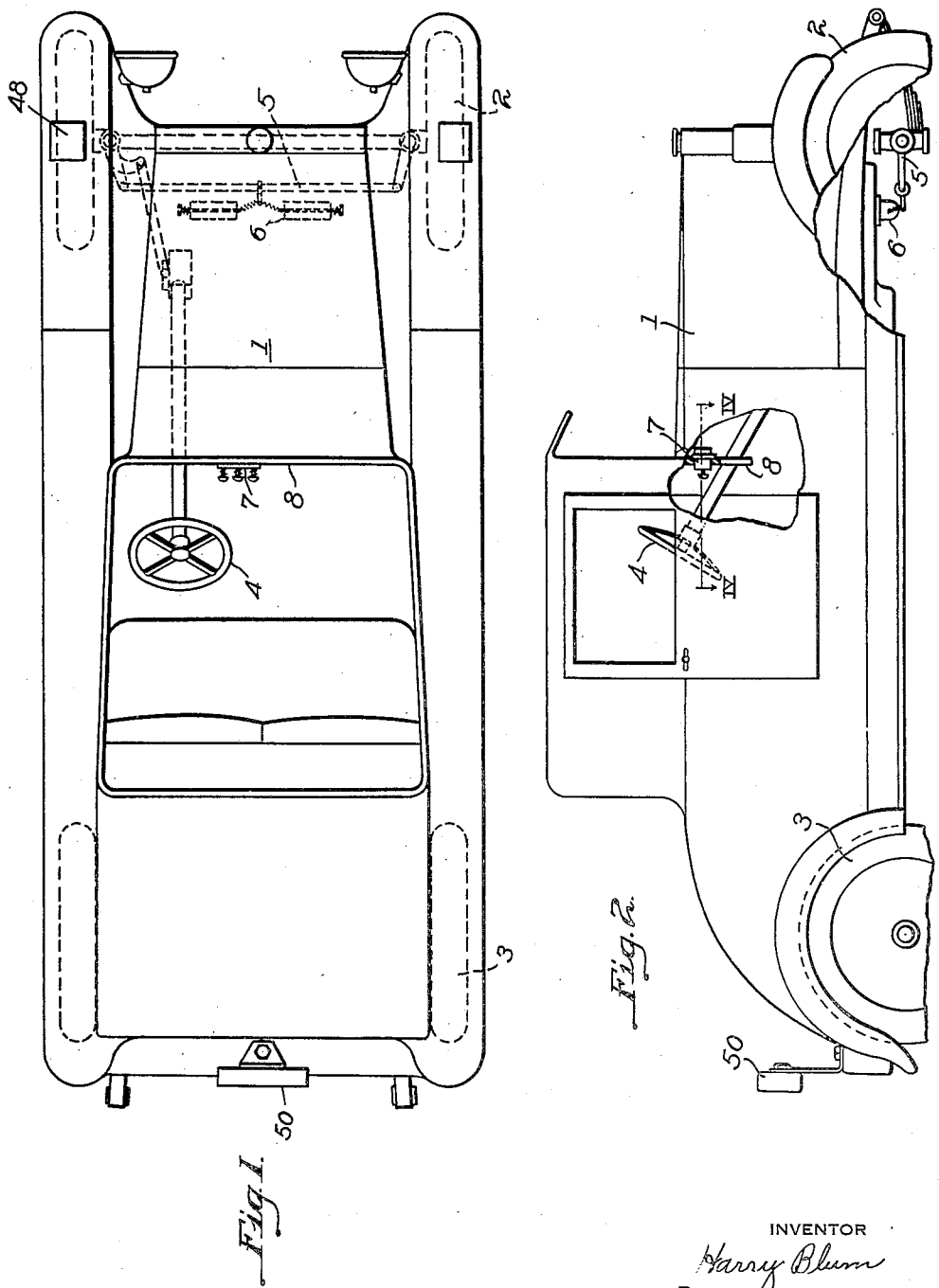
INVENTOR
Harry Blum
By
Archworth Martin
Attorney Oct. 28, 1930.    H. BLUM    1,779,799
DIRECTION INDICATOR
Filed Aug. 15, 1928    3 Sheets-Sheet 2
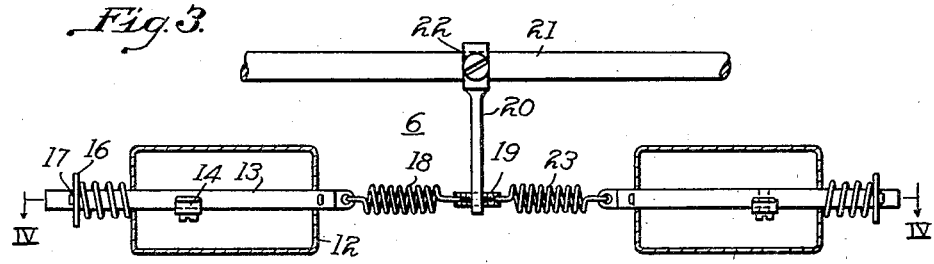
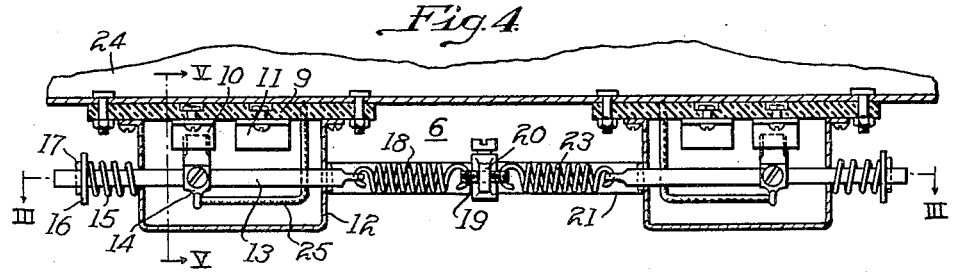
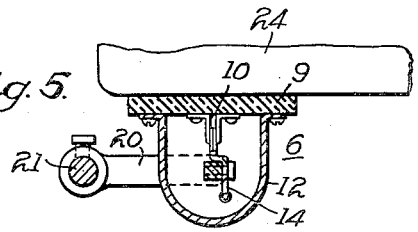
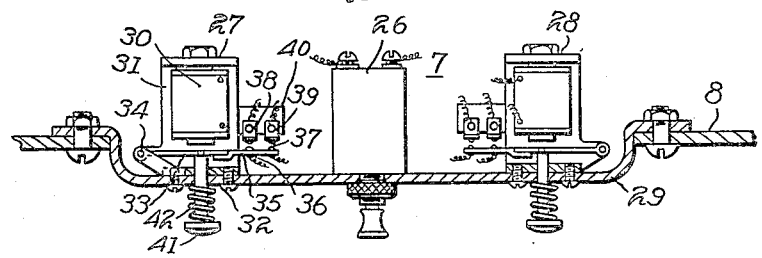
INVENTOR
Harry Blum
By
Archworth Martin
Attorney

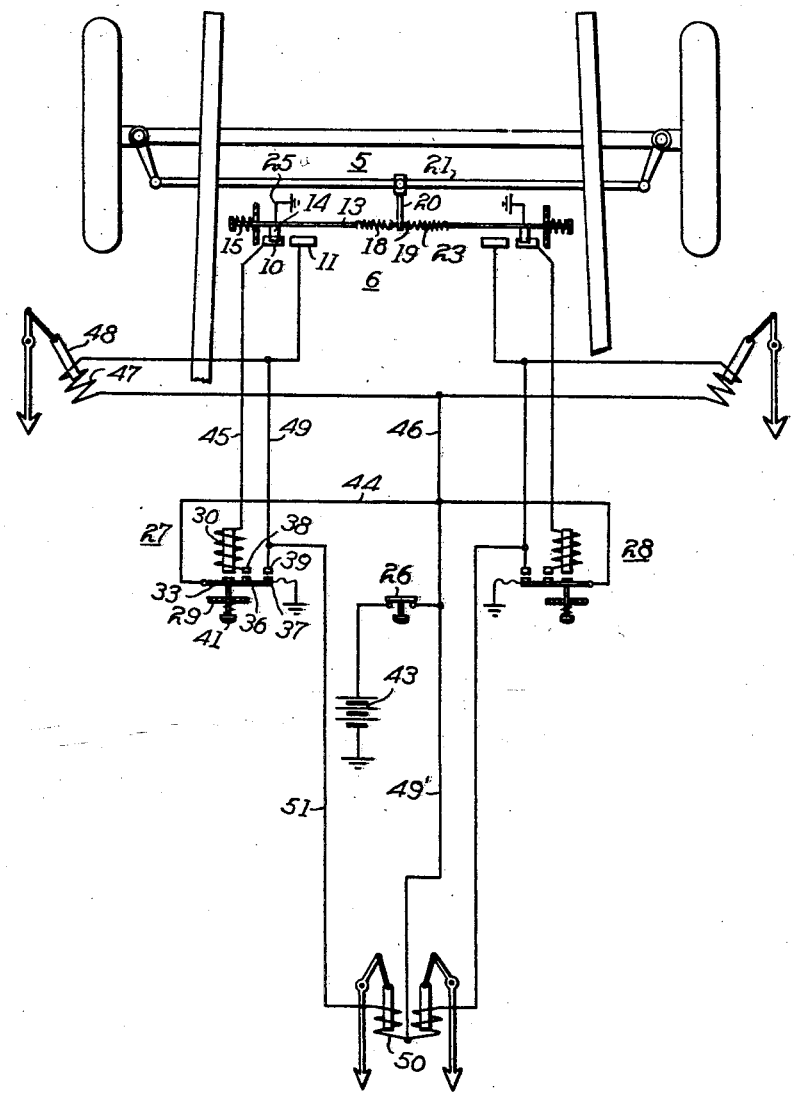

Patented Oct. 28, 1930

1,779,799

UNITED STATES PATENT OFFICE

HARRY BLUM, OF McKEES ROCKS, PENNSYLVANIA, ASSIGNOR OF ONE-HALF TO FRANCIS J. FARLEY, OF McKEES ROCKS, PENNSYLVANIA

DIRECTION INDICATOR

Application filed August 15, 1928. Serial No. 299,674.

My invention relates to an automobile turning signal, and more particularly to an improved means for operating direction signals.

One object of my invention is to provide improved means for pre-selecting the desired signal.

Another object of my invention is to provide means for automatically making and breaking signal circuits through operation of steering mechanism.

Another object of my invention is to provide means for maintaining a pre-selecting means responsive until a turn has been completed.

Another object of the invention is to design an improved circuit arrangement for signalling both front and rear of the vehicle, when a turn is to be made.

Another object is to provide a device that may be manually operated before making a turn and then automatically returned to the original position after the turn has been completed.

Still another object of my invention is to provide means whereby the desired signal may be held operated under control of the steering mechanism, independently of the original set-up means.

These and other objects of the invention will be apparent in the description, taken in conjunction with the drawings.

Referring to the drawings, Figure 1 is a plan view of an automobile equipped with my invention; Fig. 2 is a side view, in elevation, of Fig. 1, parts being broken away to more clearly illustrate the invention; Fig. 3 is a sectional view, taken on the line III—III of Fig. 4, illustrating a contactor operated by the steering mechanism; Fig. 4 is a sectional view taken on the line IV—IV of Fig. 3; Fig. 5 is a sectional view, taken on the line V—V of Fig. 4; Fig. 6 is a sectional view showing manually operated relays and a control switch for pre-selecting the desired signalling device, and Fig. 7 is a diagrammatic view of the control circuit and apparatus.

In Figs. 1 and 2 of the drawings, 1 designates the body of an automobile having front wheels 2 and rear wheels 3, a steering wheel 4 and steering mechanism 5. A contactor device or mechanism 6 is secured to the frame of the car or the under part of the crankcase, adjacent to the tie rod of the steering mechanism. Push button switches 7 are mounted upon the dash-board 8, conveniently placed for operation by the driver.

Referring to Figs. 3, 4 and 5, the contactor device 6 comprises right and left hand contactors, the left hand contactor comprising an insulating base 9, upon which the stationary contacts 10 and 11 are mounted. A casing 12 is secured to the base 9, in such position that the contact members 10 and 11 are centrally disposed within. The end walls of the casing 12 slidably support a rod 13, protruding therethrough. A contact member 14 is secured to the rod 13 and is adapted to engage the stationary contacts 10 and 11. The stationary contacts 10 and 11 are aligned in spaced-apart relation and the contact 14, when operated from one contact to the other will bridge the gap between the contacts. This "make before break" contact operation is for the purpose hereinafter described.

A spring 15 is mounted on one end of the rod 13 and engages the side wall of the casing 10. The spring 15 is suitably held in position as by the washer 16 held in place by the cotter pin 17. The spring 15 yieldingly positions the rod 13 so that the contact 14 normally engages the stationary contact 10. One end of a spring 18 is secured to the other end of the rod 13 and has its free end secured to a screw bolt 19, which is threaded into the end of an arm 20. The arm 20 is secured to the front wheel tie rod 21 as by means of the set screw 22.

The right hand contactor is the same as the left hand contactor, except the free end of spring 23, similar to the spring 18, is secured to the right end of the screw bolt 19. The arm 20 is centrally disposed between the right and left hand contactors. Since the tie rod 21 of the steering mechanism moves either to the right or the left, as a driver so desires, either the right or left hand contactor will be operated independently of the other for the purpose hereinafter described. The contactor device 6 may be secured to the frame of the car, or, as shown, to the crankcase 24. The movable contact 14 is provided with a shunt lead 25 that is connected to the crank case.

Referring to Fig. 6, push button switches 26, 27 and 28 are mounted on a base plate 29 that is suitably secured to the dashboard 8. The central push button switch 26 is any type of "push-pull" snap switch, well known in the art. The switches 27 and 28 are similar in construction, therefore only the one need to be described.

An electromagnet coil 30 is mounted on a plate 31 that is secured to the plate 29, as by the screws 32. An armature 33 is pivotally mounted to projecting lugs 34 of the plate 31, and is provided with an insulating member 35. The insulating member 35 carries contact members 36 and 37, adapted to engage stationary contact members 38 and 39. The contact members 38 and 39 are mounted on an insulating block 40, secured to the plate 31. A push pin 41, projecting through apertures in the plates 29 and 31, is provided with screw-threaded engagement with the armature 33. A spring 42 mounted on the pin 41, between an enlarged head portion of the pin and the plate 29, will bias the armature and associated contacts in the non-operated position.

Referring now to Fig. 7, the operation of the invention will be described. Assuming that the driver desires to signal his intention to turn left; before reaching the point where the left turn is to be made, the driver will momentarily press the push pin 41 of the push button switch 27, the switch on the left hand side of the push button group 7.

The inward pressure of the pin 41 causes the armature 33 of the switch 27 to move inwardly, closing the contacts 36, 37, 38 and 39.

By the closing of the contacts 36 and 38, there is a circuit completed for holding the armature 33 in its closed position, extending by way of positive battery 43, normally closed contacts of switch 26, conductor 44, closed contacts 36 and 38 of switch 27, coil 30, conductor 45, stationary contact 10 and movable contact 14, of left hand contactor 6, shunt lead 25 to the ground. The negative side of the battery 43, being grounded to the frame of the car, the above-traced circuit will be completed to hold the switch 27 operated. The contacts 10 and 14 of the contactor 6 will be closed, since the car is being driven straight ahead.

A signal is given to the traffic, ahead and rear, by the operation of suitable signalling devices, such as lights or electrically operated pointers.

The operation of the switch 27 completes a circuit to the front left hand signalling device, extending by way of battery 43, closed contacts of switch 26, conductor 46, coil 47 of the electrically operated pointer 48, conductor 49, switch contacts 39 and 37 to ground. A parallel circuit extends to the rear left signal device by way of battery 43, contacts of switch 26, conductor 49', coil 50 of the rear left signal, conductor 51, switch contacts 39 and 37 to ground. Thus, by the operation of the signalling devices, the traffic is aware of the intended left turn.

The turn being negotiated, the tie rod 21 moves to the right, thereby moving the contact 14 into engagement with the contact 11 of the contactor 6. Due to the "make before break" action of contact 14, as hereinbefore described, the circuit for the signalling devices will not be broken at this time. However, the holding circuit for the switch 27 is opened, and the armature of the switch is returned to normal position by the spring 42.

After the turn has been completed, the steering mechanism permits the spring 15 to return the contact 14 to its normal position, thus breaking the above-traced circuits for the signalling devices and they restore to normal position. If another signal is to be given, either to the right or left, the push button switch for either right or left turn is operated, and the signal is given as described, the signal for the right turn being the same as the left turn except the right hand push button 28 will be operated.

An important feature of advantage of this invention resides in the fact that if the steering mechanism is turned to the right, for example, thus energizing the right-hand signals, the left-hand signal may nevertheless be manually energized to indicate the driver's intention of turning to the left, this by reason of the fact that the left-hand movable contact 14 is connected to the ground and by reason of the flexible connection at 18ª is not displaced from the contact 10, so that if the switch 41 is depressed, to close the circuit through the left-hand signals, it will be held in closed position until after the left turn has been made and the steering mechanism again straightened, thus leaving the operator's hands free to steer the vehicle. This is an important feature, because the steering mechanism may be turned to the right for various reasons, such as in rounding a curve, passing an obstruction in the road, etc. with consequent energization of the right-hand signal. If the driver were to suddenly turn to the left without warning, collisions could easily occur. While it is true that under the abnormal condition just referred to, both right and left-hand signals would be energized, still another driver would be fully warned that the operator of the signalling device was about to turn in one direction or the other.

In case a driver operates either the right or left hand switch, in order to signal traffic of the intended turn, and then decides not to make the signalled turn, the switch 26 is provided, so that when operated, the operated switches and associated signalling devices will be restored to normal, by removing the positive battery from the control circuits.

It will be apparent that in case neither of the push buttons 27 and 28 are actuated on approaching a turn, the proper signals will be automatically actuated by turning of the steering mechanism, through closure of the circuit through contact members 14 and 11 as above explained, and the circuit will be automatically broken when the steering mechanism is returned to normal or straight-ahead position.

While I herein describe and claim the invention as applied to an automobile, it will be understood that I contemplate its application to vehicles of various other types.

I claim as my invention:

1. In an automobile signal, the combination with steering mechanism, of electrically-operated right and left-hand signals, a left turn signal contactor, a right turn signal contactor, a flexible operating connection between said mechanism and said contactors for operating either of said contactors independently of the other, a manually operative device associated with the left turn contactor, a manually operative device associated with the right turn contactor, said devices operative to pre-select a signalling device, independently of the position of the steering mechanism, and means for maintaining said signalling devices operated until a turn has been completed.

2. An automobile signal comprising, in combination with steering mechanism, electrically-operated right and left hand signal devices, a pair of stationary contacts each in series with one of said devices, a pair of manually-operable switches each controlling the circuit of one of said devices, a holding coil for each of said switches, a second pair of stationary contacts each connected in series with one of said coils, a pair of movable contact members each connected to ground and normally engaging one of the said second pair of stationary contacts, and yieldable connections between the movable contact members and the steering mechanism for causing movement of one of said contact members into engagement with one of said first-named stationary contacts when the steering mechanism is operated in one direction, without shifting the other one of said contact members, and for causing independent movement of the other contact member into engagement with the other one of the first-named stationary contacts when the steering mechanism is operated in the opposite direction.

3. An automobile signal comprising, in combination with steering mechanism, electrically-operated right and left hand signal devices, a pair of stationary contacts each in series with one of said devices, a pair of manually-operable switches each controlling the circuit of one of said devices, a holding coil for each of said switches, a second pair of stationary contacts each connected in series with one of said coils, a pair of movable contact members each connected to ground and normally engaging one of the said second pair of stationary contacts, lost-motion connections between the movable contact members and the steering mechanism for causing movement of one of said contact members into engagement with one of said first-named stationary contacts when the steering mechanism is operated in one direction, without shifting the other one of said contact members, and for causing independent movement of the other contact member into engagement with the other one of the first-named stationary contacts when the steering mechanism is operated in the opposite direction, and means for restoring the movable contact members to normal position when the steering mechanism is returned to intermediate, normal, position.

In testimony whereof I the said HARRY BLUM have hereunto set my hand.

HARRY BLUM.